(12) United States Patent
Kim et al.

(10) Patent No.: US 7,557,893 B2
(45) Date of Patent: Jul. 7, 2009

(54) COLOR FILTER SUBSTRATE FOR LIQUID CRYSTAL DISPLAY DEVICE AND METHOD FOR FABRICATING THE SAME

(75) Inventors: Bong Chul Kim, Daegu (KR); Seung Hyung Lee, Gyeonggi-do (KR); Kyo Yong Koo, Gyeongsangbuk-do (KR); Hyeon Jin Seo, Gyeongsangbuk-do (KR); Dhang Kwon, Daejeon (KR); Robert Taff, Pleasanton, CA (US)

(73) Assignee: LG Display Co., Ltd., Seoul (KR)

( * ) Notice: Subject to any disclaimer, the term of this patent is extended or adjusted under 35 U.S.C. 154(b) by 220 days.

(21) Appl. No.: 11/647,233

(22) Filed: Dec. 29, 2006

(65) Prior Publication Data

US 2008/0003380 A1    Jan. 3, 2008

(30) Foreign Application Priority Data

Jun. 29, 2006   (KR)   .................... 10-2006-0059021

(51) Int. Cl.
G02F 1/1339    (2006.01)
G02F 1/1333    (2006.01)
G02F 1/1335    (2006.01)

(52) U.S. Cl. ................ 349/155; 349/158; 349/106
(58) Field of Classification Search .......... 349/106, 349/122, 155–158; 427/162; 428/1.1
See application file for complete search history.

(56) References Cited

U.S. PATENT DOCUMENTS

| | | | |
|---|---|---|---|
| 2005/0140915 A1* | 6/2005 | Paek et al. | 349/155 |
| 2006/0279688 A1* | 12/2006 | Wu et al. | 349/155 |
| 2007/0019148 A1* | 1/2007 | Ueda | 349/155 |
| 2007/0132921 A1* | 6/2007 | Yoon | 349/107 |

* cited by examiner

*Primary Examiner*—Frank G Font
*Assistant Examiner*—Jerry Blevins
(74) *Attorney, Agent, or Firm*—Holland & Knight LLP

(57) ABSTRACT

A color filter substrate includes a black matrix on a transparent insulating substrate, the blacking matrix defining a pixel area, color filters in the pixel area, an overcoating layer over the black matrix and the color filters, the overcoating layer having a plurality of grooves, a plurality of column spacers on the overcoating layer, and a plurality of ball spacers in the grooves of the overcoating layer.

18 Claims, 2 Drawing Sheets

COLOR FILTER SUBSTRATE FOR LIQUID CRYSTAL DISPLAY DEVICE AND METHOD FOR FABRICATING THE SAME

The invention claims the benefit of Korean Patent Application No. 2006-0059021 filed in Korea on Jun. 29, 2006, which is hereby incorporated by reference in its entirety.

BACKGROUND OF THE INVENTION

1. Field of the Invention

Embodiments of the invention relates to a display device, and more particularly, to a color filter substrate for a liquid crystal display device and a method of fabricating the same. Although embodiments of the invention are suitable for a wide scope of applications, they are particularly suitable for obtaining a color filter substrate for a liquid crystal display device and a method of fabricating the same that prevent a gravity defect and a touch defect.

2. Discussion of the Related Art

The importance of electronic displays is growing in today's information society, and various types of electronic displays have been extensively used in various industrial fields. The electronic display field has been developing more and more, and electronic displays that have improved performance capable of satisfying various demands of information society have continuously been developed.

Generally, an electronic display is an apparatus for visually transmitting a variety of information to humans. The electronic display is an electronic device that converts electronic information signals output from various types of electronics to light information signals that are capable of being recognized by the human eye. An electronic display may be considered as a bridging device for connecting humans to the electronic machines.

Of the electronic displays, a display device for displaying a light information signal using light emission is called a light emitting display device, and another display employing light modulation by means of reflection, scattering, and interference is called a light receiving display device. Examples of light emitting display devices, which also are referred to as active display devices, are a cathode ray tube ("CRT") device, a plasma display panel ("PDP") device, an organic electroluminescent display ("OELD") device, and a light emitting diode ("LED") device. In addition, examples of light receiving displays, which also are referred to as passive display devices, are a liquid crystal display ("LCD") device and an electrophoretic image display ("EPID") device.

Light emitting display devices have been applied to televisions and computer monitors. The cathode ray tube ("CRT"), which is the display having the longest history, has a large market share in terms of economic efficiency, but has many disadvantages, including heavy weight, large volume, and high power consumption. With the recent trend of voltage reduction and electric power reduction of electronic devices based on rapid advances in semiconductor technology and the recent trend toward miniaturized, slim, and light electronic machines, the demand for flat panel displays as electronic displays that are suitable for novel environments is rapidly growing.

To satisfy the demand, flat panel displays, such as a liquid crystal display ("LCD") device, a plasma display panel ("PDP") device and an organic electroluminescent display ("OELD") device, has been developed. Of the flat panel displays, the liquid crystal display device, which is small, light, and slim and has low power consumption and low driving voltage, is being watched.

In a liquid crystal display device, a liquid crystal material having anisotropic dielectricity is formed between a color filter substrate on which a color filter and a black matrix are formed and an array substrate on which a thin film transistor ("TFT") component and a pixel electrode are formed. An LCD device also includes a common electrode, which is formed on one of the color filter substrate and the array substrate. Different electric potentials are applied to the pixel and common electrodes to control the intensity of an electric field. Such an electric field changes the molecular arrangement of the liquid crystal material, thereby controlling the intensity of light penetrating the color filter substrate and the array substrate, resulting in the display of desired images.

In general, a spacer is formed between the color filter substrate and array substrate of the liquid crystal display device to maintain a cell gap constant, and the spacer may be a ball spacer having a spherical shape disposed on the substrate. The ball spacer is easy to use even under a certain temperature condition because it has an expansion coefficient similar to that of the liquid crystal material depending on a temperature change. However, the ball spacer is moved when vibration or shock is applied to the liquid crystal display device, thereby distorting the liquid crystal orientation. This causes light leakage, resulting in a decrease in the contrast ratio of the liquid crystal display device.

An alternative for solving this problem is a method of forming a column spacer patterned on a substrate, instead of a ball spacer. The column spacer can be formed at a desired position of a substrate to prevent light leakage caused by dispersion and does not move. For example, the column spacer can be formed on one of the array substrate and the color filter substrate. In the manufacturing process of a liquid crystal display device, an array substrate and a color filter substrate undergo their respective procedures and thereafter are bonded to each other. Thus, it is possible to keep production in line with the array substrate by forming a column spacer on a color filter substrate that undergoes a relatively simple procedure.

However, a liquid crystal display device with a column spacer still experiences problems like a gravity defect, in which liquid crystals are concentrated in a downward gravity direction under a high temperature environment, or a touch defect, which is caused by a pressure applied to the liquid crystal display.

SUMMARY OF THE INVENTION

Accordingly, embodiments of the invention is directed to a color filter substrate for a liquid crystal display device and a method of fabricating the same that substantially obviate one or more of the problems due to limitations and disadvantages of the related art.

An object of embodiments of the invention is to provide a color filter substrate for a liquid crystal display device that prevents a gravity defect and a touch defect and a method of fabricating the same.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a color filter substrate includes a black matrix on a transparent insulating substrate, the blacking matrix defining a pixel area, color filters in the pixel area, an overcoating layer over the black matrix and the color filters, the overcoating layer having a plurality of grooves, a plurality of column spacers on the overcoating layer, and a plurality of ball spacers in the grooves of the overcoating layer.

In another aspect, a method for fabricating a color filter substrate includes forming a black matrix defining a pixel area on a transparent insulating substrate, forming color filters in the pixel area, forming an overcoating layer over the black matrix and the color filers, the overcoating layer having a plurality of grooves, forming column spacers on the overcoating layer, and disposing the ball spacers in the grooves of the overcoating layer.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
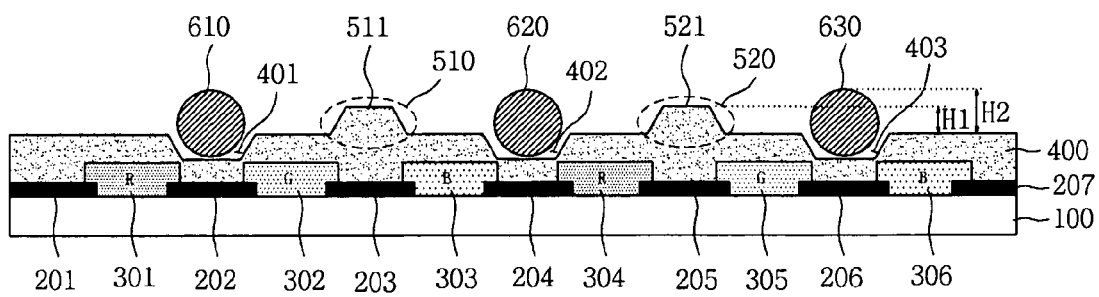
FIG. 1 is a cross-sectional view illustrating a color filter substrate for a liquid crystal display according to an embodiment of the invention.

FIG. 1 is a cross-sectional view illustrating a color filter substrate for a liquid crystal display according to an embodiment of the invention. In FIG. 1, a color filter substrate includes a black matrix 201, 202, 203, 204, 205, 206, and 207, an overcoating layer 400, column spacers 510 and 520, and ball spacers 610, 620, and 630. The black matrix 201, 202, 203, 204, 205, 206, and 207 is formed on a transparent insulating substrate 100 outlining a pixel area. For example, the black matrix 201, 202, 203, 204, 205, 206, and 207 may be above gate and data lines of a corresponding array substrate of the display device. The transparent insulating substrate 100 may be formed of glass. The black matrix 201, 202, 203, 204, 205, 206, and 207 may be formed of chrome (Cr), a chrome oxide film ($Cr_2O_3$), black resin or a material that absorbs light.

In addition, the color filter substrate includes red color filters 301 and 304 realizing red color and corresponding to red (R) pixels, green color filters 302 and 305 realizing green color and corresponding to green (G) pixels, and blue color filters 303 and 306 realizing blue color and corresponding to blue (B) pixels. The red color filters 301 and 304, the green color filters 302 and 305, and the blue color filters 303 and 306 are formed in pixel areas outlined by the black matrix 201, 202, 203, 204, 205, 206, and 207. Further, the red color filters 301 and 304, the green color filters 302 and 305, and the blue color filters 303 and 306 are formed alternately in the pixel areas outlined by the black matrix 201, 202, 203, 204, 205, 206, and 207.

Moreover, the overcoating layer 400 is formed on the black matrix 201, 202, 203, 204, 205, 206, and 207 and the color filters 301, 302, 303, 304, 305, and 306 to planarize the upper portion of the black matrix 201, 202, 203, 204, 205, 206, and 207, to thereby prevent dissolution of pigment ions. The overcoating layer 400 may be formed of a transparent material having an insulating characteristic, such as acryl resin or epoxy resin. The overcoating layer 400 has grooves 401, 402, and 403 where the ball spacers 610, 620, and 630 are disposed.

The column spacers 510 and 520 are formed of the same material as the overcoating layer 400 on the overcoating layer 400. Accordingly, the overcoating layer 400 having the grooves 401, 402, and 403 where the ball spacers 610, 620, and 630 are to be disposed and the column spacers 510 and 520 may be simultaneously formed, thereby effectively reducing the steps of the manufacturing process. Although not shown, in addition to having a trapezoidal cross section, column spacers 510 and 520 may have various shapes, such as a rectangular cross section.

Furthermore, the ball spacers 610, 620, and 630 are disposed in the grooves 401, 402, and 403 of the overcoating layer 400. Accordingly, the arrangement of the ball spacers 610, 620, and 630 is more accurate since the ball spacers 610, 620, and 630 held in the grooves 401, 402, and 403 of the overcoating layer 400, respectively. Thus, the ball spacers 610, 630, and 630 are prevented from moving even if vibration or shock is applied to the liquid crystal display device, thereby effectively suppressing light leakage caused by the distortion of the orientation of the liquid crystal material. The ball spacers 610, 620, and 630 may be formed of plastic ball spacers having a good elastic characteristic. When plastic ball spacers are used as the ball spacers 610, 620, and 630, the diameter of the plastic ball spacers are varied depending on a pressure applied to the liquid crystal display device, to thereby effectively suppress a touch effect on the liquid crystal display device.

The plastic ball spacers have a value close to the coefficient of thermal expansion of liquid crystal material. Thus, even if the transparent insulating substrate 100 is expanded at a high temperature, the plastic balls spacers are also expanded along with the transparent insulating substrate 100, which enables a cell gap of the liquid crystal display to be maintained constant, thereby suppressing a gravity defect in which liquid crystal is concentrated in a downward gravity direction.

The column spacers 510 and 520 and the ball spacers 610, 620, and 630 are located overlapping the black matrix 201, 202, 203, 204, 205, 206, and 207. Accordingly, the aperture ratio of the liquid crystal display does not need to be reduced. Further, the column spacers 510 and 520 and the ball spacers 610, 620, and 630 are located in an alternating manner. Accordingly, a gravity defect and a touch effect are prevented, while light leakage caused by spacer movement also is prevented.

The protrusion height H2 of the ball spacers 610, 620, and 630 is greater than the protrusion height H1 of the column spacers 510 and 520. The protrusion heights H1 and H2 may be measured with respective to the main planarizing surface of the overcoating layer 400. More specifically, the protrusion height H2 of the ball spacers 610, 620, and 630 may be about $^{11}/_{10}$ to $^{13}/_{10}$ of the protrusion height H1 of the column spacers 510 and 520. Accordingly, it is possible to effectively suppress a gravity defect, a touch defect, and light leakage caused by spacer movement, while effectively reducing the density of the ball spacers 610, 620, and 630 and the formation area of the column spacers 510 and 520.

The ball spacers 610, 620, and 630 may be formed at a density of 50 spacers/mm² to 300 spacers/mm², and the sum of the areas of the top surfaces 511 and 521 of the column spacer 510 and 520 may be about 0.2% to 1.0% of the area of the transparent insulating substrate 100.

On the color filter substrate for a liquid crystal display according to an embodiment of the invention, the ball spacers 610, 620, and 630 and the column spacers 510 and 520 are located alternately from one another, and overlap the black matrix 201, 202, 203, 204, 205, 206, 206 and 207, thereby suppressing a gravity defect, a touch defect, and light leakage caused by spacer movement.

Figure 2A:
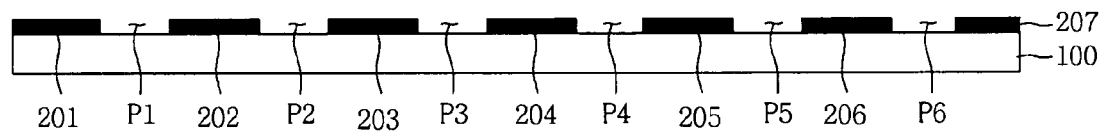
FIGS. 2A to 2D are cross-sectional views illustrating a method of fabricating a color filer substrate for a liquid crystal display according to an embodiment of the invention.

FIGS. 2A to 2D are cross-sectional views illustrating a method of fabricating a color filer substrate for a liquid crystal display according to an embodiment of the invention. As illustrated in FIG. 2A, a black matrix 201, 202, 203, 204, 205, 206, and 207 defining pixel areas P1 to P6 is formed on a transparent insulating substrate 100. The transparent insulating substrate 100 may be formed of glass. The black matrix 201, 202, 203, 204, 205, 206, and 207 may be formed by depositing chrome (Cr) or a chrome oxide film ($Cr_2O_3$) and patterning the deposited material. Alternatively, the black matrix 201, 202, 203, 204, 205, 206, and 207 may be formed by coating a light-absorbing black resin and patterning the coated material.

Figure 2B:
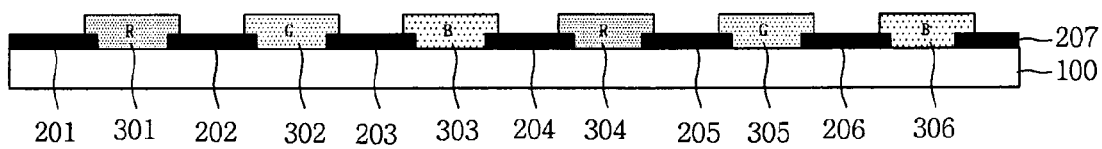

As illustrated in FIG. 2B, color filters 301, 302, 303, 304, 305, and 306 are formed in the pixel areas P1 to P6 defined by the black matrix 201, 202, 203, 204, 205, 206, and 207. The color filters 301 and 304 may be red color filters realizing red color and corresponding to red (R) pixels, the color filters 302 and 305 may be green color filters realizing green color and corresponding to green (G) pixels, and the color filters 303 and 306 may be blue color filters realizing blue color and corresponding to blue (B) pixels. The red color filters 301 and 304, green color filters 302 and 305 and blue color filters 303 and 306 are formed alternately in the pixel areas P1 to P6 defined by the black matrix 201, 202, 203, 204, 205, 206, and 207.

Figure 2C:
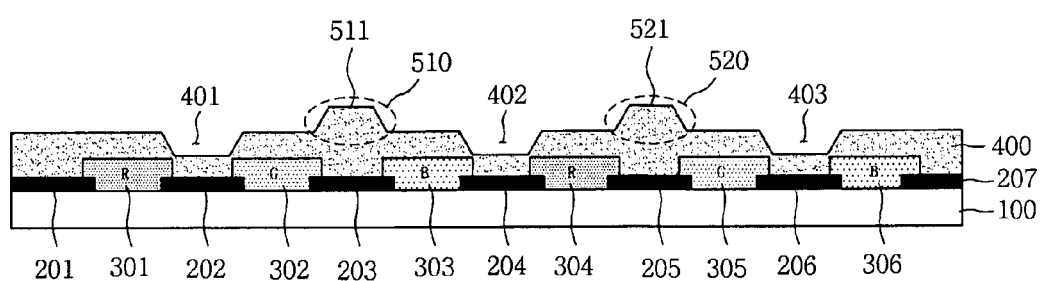

As illustrated in FIG. 2C, an overcoating layer 400 is formed on the black matrix 201, 202, 203, 204, 205, 206, and 207 and the color filters 301, 302, 303, 304, 305, and 306. The overcoating layer 400 is formed to have grooves 401, 402, and 403 where ball spacers 610, 620, and 630 are to be disposed. In addition, column spacers 510 and 520 are formed on the overcoating layer 400. The overcoating layer 400 is formed on the black matrix 201, 202, 203, 204, 205, 206, and 207 and the color filters 301, 302, 303, 304, 305, and 306 to planarize the upper portion of the black matrix 201, 202, 203, 204, 205, 206, and 207, to thereby prevent dissolution of pigment ions. The overcoating layer 400 may be formed of a transparent material having an insulating characteristic, such as acryl resin or epoxy resin.

The column spacers 510 and 520 are formed of the same material as the overcoating layer 400 on the overcoating layer 400. Accordingly, the overcoating layer 400 having the grooves 401, 402, and 403 where the ball spacers 610, 620, and 630 are to be disposed and the column spacers 510 and 520 may be simultaneously formed, thereby effectively reducing the steps of the manufacturing process. The overcoating layer 400 and the column spacers 510 and 520 may be simultaneously formed by a photolithography process using a halftone mask and a refractive mask. Although not shown, in addition to having a trapezoidal cross section, column spacers 510 and 520 may be formed to have various shapes, such as a rectangular cross section.

Figure 2D:
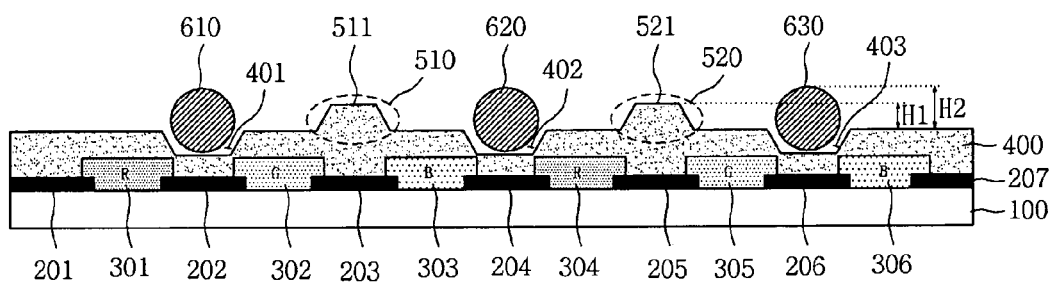

As illustrated in FIG. 2D, the ball spacers 610, 620, and 630 are disposed in the grooves 401, 402, and 403 of the overcoating layer 400. The ball spacers 610, 620, and 630 may be formed of plastic ball spacers having a good elastic characteristic. The ball spacers 610, 620, and 630 may be disposed by a wet spray method, in which the ball spacers 610, 620, and 630 are mixed in alcohol or the like and sprayed or a dry spray method in which only the ball spacers 610, 620, and 630 are sprayed.

Accordingly, in the method for fabricating a color filter substrate for a liquid crystal display according to an embodiment of the invention, the arrangement of the ball spacers 610, 620, and 630 is more accurate since the ball spacers 610, 620, and 630 held in the grooves 401, 402, and 403 of the overcoating layer 400, respectively. Thus, the ball spacers 610, 630, and 630 are prevented from moving even if vibration or shock is applied to the liquid crystal display device, thereby effectively suppressing light leakage caused by the distortion of the orientation of the liquid crystal material. When plastic ball spacers are used as the ball spacers 610, 620, and 630, the diameter of the plastic ball spacers are varied depending on a pressure applied to the liquid crystal display device, to thereby effectively suppress a touch effect on the liquid crystal display device.

Moreover, in the step of forming the column spacers 510 and 520, the grooves 401, 402, and 403 of the overcoating layer 400 and the ball spacers 610, 620, and 630 are disposed are formed overlapping the black matrix 201, 202, 203, 204, 205, 206, and 207. In addition, the grooves 401, 402, and 403 of the overacting layer 400 and the ball spacers 610, 620, and 630 are formed to be alternately located. Accordingly, the ball spacers 610, 620, and 630 and the column spacers 510 and 520 are formed to be alternately located overlapping the black matrix 201, 202, 203, 204, 205, 206, and 207.

The protrusion height of the ball spacers 610, 620, and 630 with respect to the main planarizing surface of the overcoating layer 400 is formed to be greater than the protrusion height of the column spacers 510 and 520. More specifically, the protrusion height of the ball spacers 610, 620, and 630 may be about $^{11}/_{10}$ to $^{13}/_{10}$ of the protrusion height of the column spacers 510 and 520. Further, the ball spacers 610, 620, and 630 may be formed at a density of 50 spacers/mm² to 300 spacers/mm², and the sum of the areas of the top surfaces 511 and 521 of the column spacer 510 and 520 may be about 0.2% to 1.0% of the area of the transparent insulating substrate 100.

In the method for fabricating a color filter substrate for a liquid crystal display according to an embodiment of the invention, the overcoating layer 400 having the grooves 401, 402, and 403 where the ball spacers 610, 620, and 630 are to be disposed and the column spacers 510 and 520 may be simultaneously formed by a photolithography process using a halftone mask and a refractive mask, thereby reducing the steps of the manufacturing process.

The ball spacers 610, 620, and 630 are disposed in the grooves 401, 402, and 403 of the overcoating layer 400, thereby improving the accuracy of the arrangement of the ball spacers 610, 620, and 630. Moreover, it is possible to prevent the ball spacers 610, 620, and 630 from moving, as the ball spacers 610, 620, and 630 are prevented from moving out of the grooves 401, 402, and 403, even if vibration or shock is applied to the liquid crystal display device.

Moreover, the protrusion height of the ball spacers 610, 620, and 630 is greater than the protrusion height of the column spacers 510 and 520. Thus, a gravity defect, a touch defect and light leakage caused by spacer movement are prevented, and the density of the ball spacers 610, 620, and 630 and the formation area of the column spacers 510 and 520 are reduced, respectively.

Hence, in the color filter substrate and the method of fabricating the same according to an embodiment of the invention, the color filter substrate includes ball spacers disposed in grooves of an overcoating layer and column spacers on the overcoating layer. The ball spacers and the column spacers are alternately located from one another and overlap a black matrix of the substrate. Thus, a gravity defect and a touch defect and light leakage caused by spacer movement are prevented.

In addition, in the color filter substrate and the method of fabricating the same according to an embodiment of the invention, the overcoating layer and the column spacers are simultaneously formed. The overcoating layer and the column spacers may be formed by a photolithography process using a halftone mask and a refractive mask, thereby reducing the steps of the manufacturing process.

Moreover, in the color filter substrate and the method of fabricating the same according to an embodiment of the invention, the protrusion height of the ball spacers is greater than the protrusion height of the column spacers. The protrusion heights of the ball spacers and the column spacers may be measured with respective to the main planarizing surface of the overcoating layer. Thus, a gravity defect, a touch defect and light leakage caused by spacer movement are suppressed, and the density of the ball spacers and the formation area of the column spacers are reduced, respectively.

It will be apparent to those skilled in the art that various modifications and variations can be made in the color filter substrate for a liquid crystal display device and the method of fabricating the same of embodiments of the invention without departing from the spirit or scope of the invention. Thus, it is intended that embodiments of the invention cover the modifications and variations of this invention provided they come within the scope of the appended claims and their equivalents.

What is claimed is:

1. A color filter substrate, comprising:
a black matrix on a transparent insulating substrate, the blacking matrix defining a pixel area;
color filters in the pixel area;
an overcoating layer over the black matrix and the color filters, the overcoating layer having a plurality of grooves;
a plurality of column spacers on the overcoating layer; and
a plurality of ball spacers in the grooves of the overcoating layer,
wherein the ball spacers has a protrusion height greater than a protrusion height of the column spacers.

2. The color filter substrate of claim 1, wherein the column spacers and the ball spacers overlap the black matrix.

3. The color filter substrate of claim 1, wherein the column spacers and the ball spacers are alternately located with one another.

4. The color filter substrate of claim 1, wherein the overcoating layer includes the same material as the column spacers.

5. The color filter substrate of claim 1, wherein the protrusion height of the ball spacers is about $11/10$ to $13/10$ of the protrusion height of the column spacers.

6. The color filter substrate of claim 1, wherein the density of the ball spacers is about 50 spacers/mm2 to 300 spacers/mm2.

7. The color filter substrate of claim 1, wherein the sum of the top surface areas of the column spacers is about 0.2% to 1.0% of the surface area of the transparent insulating substrate.

8. The color filter substrate of claim 1, wherein the grooves overlap the black matrix.

9. The liquid crystal display device having the color filter substrate of claim 1, further comprising:
an array substrate; and
a liquid crystal layer between the array substrate and the color filter substrate.

10. A method for fabricating a color filter substrate, comprising:
forming a black matrix defining a pixel area on a transparent insulating substrate;
forming color filters in the pixel area;
forming an overcoating layer over the black matrix and the color filers, the overcoating layer having a plurality of grooves;
forming column spacers on the overcoating layer; and
disposing ball spacers in the grooves of the overcoating layer,
wherein the forming the column spacers includes forming the column spacer having a protrusion height less than a protrusion height of the ball spacers.

11. The method of claim 10, wherein the column spacers and the ball spacers are formed overlapping the black matrix.

12. The method of claim 10, wherein the column spacers and the ball spacers are formed to be alternately located with one another.

13. The method of claim 10, wherein the column spacers and the overcoating layer are simultaneously formed.

14. The color filter substrate of claim 10, wherein the protrusion height of the ball spacers is about $11/10$ to $13/10$ of the protrusion height of the column spacers.

15. The method of claim 10, wherein the density of the ball spacers is 50 spacers/mm2 to 300 spacers/mm2.

16. The method of claim 10, wherein the sum of the top surface areas of the column spacers is about 0.2% to 1.0% of the surface area of the transparent insulating substrate.

17. The method of claim 10, wherein the forming the overcoating layer includes forming the grooves overlapping the black matrix.

18. The method of claim 10, wherein the forming the overcoating layer and the forming the column spacers include depositing a planarizing layer on the transparent insulating substrate.

* * * * *